(12) United States Patent
Matsuda et al.

(10) Patent No.: US 10,436,484 B2
(45) Date of Patent: Oct. 8, 2019

(54) CAULKING FIXATION TYPE POWER ELEMENT AND EXPANSION VALVE USING THE SAME

(71) Applicant: FUJIKOKI CORPORATION, Tokyo (JP)

(72) Inventors: Ryo Matsuda, Tokyo (JP); Junya Hayakawa, Tokyo (JP)

(73) Assignee: FUJIKOKI CORPORATION, Tokyo (JP)

( * ) Notice: Subject to any disclaimer, the term of this patent is extended or adjusted under 35 U.S.C. 154(b) by 73 days.

(21) Appl. No.: 15/079,107

(22) Filed: Mar. 24, 2016

(65) Prior Publication Data

US 2016/0290692 A1 Oct. 6, 2016

(30) Foreign Application Priority Data

Apr. 3, 2015 (JP) .................................. 2015-077094

(51) Int. Cl.
*F16K 31/00* (2006.01)
*F25B 41/06* (2006.01)
*F25B 49/02* (2006.01)

(52) U.S. Cl.
CPC .......... *F25B 41/062* (2013.01); *F16K 31/002* (2013.01); *F25B 49/02* (2013.01); *F25B 2341/0683* (2013.01); *F25B 2500/01* (2013.01)

(58) Field of Classification Search
CPC ....... F25B 41/062; F25B 49/02; F16K 31/002
See application file for complete search history.

(56) References Cited

U.S. PATENT DOCUMENTS 5,943,871 A * 8/1999 Ito .......................... F25B 41/062
236/92 B
2005/0120741 A1* 6/2005 Nanbu ................... F25B 41/062
62/527

FOREIGN PATENT DOCUMENTS

| EP | 1267135 A2 | 12/2002 |
|----|------------|---------|
| EP | 2503267 A2 | 9/2012 |
| JP | 2000304381 A | 11/2000 |
| JP | 2005-164208 A | 6/2005 |
| JP | 2006105474 A | 4/2006 |

(Continued)

OTHER PUBLICATIONS

Translation of JP 2006105474A.*

(Continued)

*Primary Examiner* — Edward F Landrum
*Assistant Examiner* — Nael N Babaa
(74) *Attorney, Agent, or Firm* — Bacon & Thomas, PLLC

(57) ABSTRACT

A caulking fixation type power element has a diaphragm, an upper lid member forming a pressure actuation chamber with a working gas, a receiving member provided with a through hole in its center portion and arranged in an opposite side to the upper lid member in relation to the diaphragm, and a stopper member arranged in a lower space formed between the diaphragm and the receiving member, and is integrated according to a circumferential welding by lapping the upper lid member, the diaphragm and the receiving member, the stopper member has a main body portion inserted to the through hole of the receiving member, and a flange portion having a larger diameter than the through hole and formed in one end of the main body portion, and the flange portion is arranged so as to come into contact with the receiving member from the lower space side.

5 Claims, 3 Drawing Sheets

(56) References Cited

FOREIGN PATENT DOCUMENTS

| JP | 2012-197990 A | 10/2012 |
|----|---------------|---------|
| WO | 2011/122435 A1 | 10/2011 |

OTHER PUBLICATIONS

European Search Report in corresponding European Application No. EP 16162113.1, dated Aug. 17, 2016.
Japanese Office Action in corresponding Japanese Application No. 2015-077094, dated Oct. 30, 2018.

* cited by examiner

CAULKING FIXATION TYPE POWER ELEMENT AND EXPANSION VALVE USING THE SAME

BACKGROUND OF THE INVENTION

Field of the Invention

The present invention relates to a temperature sensing mechanism built-in type expansion valve which is used in a refrigeration cycle, and more particularly to an expansion valve in which a power element is attached to a valve main body on the basis of a caulking structure.

Description of the Conventional Art

Conventionally, a temperature sensing mechanism built-in type temperature expansion valve regulating a passage amount of refrigerant is used in a refrigeration cycle which is used for an air conditioning system mounted on a motor vehicle, for saving an installation space and a piping work (refer, for example, to patent document 1). The valve main body of the expansion valve has an inlet port to which the refrigerant having high pressure is introduced, and a valve chamber which is communicated with the inlet port.

A spherical valve member arranged within the valve chamber faces to a valve seat of a valve hole which is open to the valve chamber, and is operated by a valve rod which is driven by the power element so as to control an opening degree of a throttle passage in relation to the valve seat.

Further, the refrigerant passing through the valve hole is fed from an outlet port to an evaporator side. The refrigerant turning back to a compressor side from the evaporator passes through a return passage which is provided in the valve main body.

The valve main body is equipped in its top portion with a valve member driving mechanism which is called as a power element. The power element is constructed by an upper lid member which forms a pressure actuation chamber, a thin plate diaphragm which is elastically deformed by pressure application, and a disc-like receiving member, and is formed by lapping three members and bonding their outer peripheral portions according to a TIG welding means or a laser welding means.

A working gas is sealed into a pressure actuation chamber which is formed by the upper lid member and the diaphragm. At this time, in order to seal the working gas in the pressure actuation chamber, a hole is provided in a top portion of the upper lid member, the hole is closed by such as a steel ball after the working gas is sealed in from the hole, and the pressure actuation chamber is sealed by a projection welding means.

In the temperature sensing mechanism build-in type temperature expansion valve disclosed in the patent document 1, a lower cover of the power element is fixed to a screw hole of the valve main body by being threadably attached, when the power element is attached to the valve main body.

Therefore, it is necessary to previously work screws in both of the power element and the valve main body at the attaching time, thereby causing increase of a manufacturing step and a cost as a whole of the expansion valve.

Further, due to the structure in which the power element is threadably attached to the valve main body, variation may occur in some screwing depth in a positional relationship in a height direction between the power element and the valve main body.

As an expansion valve which solves these problems, there has been known an expansion valve in which a power element is integrated in an upper end portion of a valve main body by being caulked and fixed (refer, for example, to patent document 2).

By employing the structure mentioned above, it is possible to enhance a positioning precision in a height direction as well as it is possible to omit previous threading applied to the power element and the valve main body.

Further, in the present specification, the power element of the type which is caulked and fixed to the upper end portion of the valve main body as shown in the patent document 2 is called as "caulking fixation type power element".

PRIOR ART DOCUMENT

Patent Documents

Patent Document 1: Japanese Unexamined Patent Publication No. 2005-164208

Patent Document 2: Japanese Unexamined Patent Publication No. 2012-197990

SUMMARY OF THE INVENTION

Problem to be Solved by the Invention

In the power element shown in the patent document 1 and the patent document 2, it is necessary to seal the working gas in the pressure actuation chamber which is formed between the upper lid member and the diaphragm, as mentioned above.

The working gas may be sealed in after the power element is attached to the valve main body, however, the power element is manufactured according to a procedure that the working gas is sealed in the pressure actuation chamber in a state of the power element single body before the power element is attached to the valve main body, for facilitating handling of the sealed material (a whole of the expansion valve) at the sealing time.

FIGS. 3A and 3B are vertical cross sectional views showing a structure of a caulking fixation type power element which is applied to the patent document 2, in which FIG. 3A shows a state before the working gas is sealed in, and FIG. 3B shows a state after the working gas is sealed in.

In FIGS. 3A and 3B, when the caulking fixation type power element described in the patent document 2 is assembled, an upper lid member 1, a diaphragm 2 and a receiving member 3 are lapped and are circumferentially welded their outer peripheral portions, the working gas is sealed in from a hole which is formed in the upper lid member 1, and the hole is thereafter sealed by a plug 4. Further, the power element in which the working gas is sealed constructs a part of the expansion valve by being caulked and fixed to the valve main body.

Here, in the power element after the working gas is sealed therein, a pressure (an internal pressure) of an internal space 1a between the upper lid member 1 and the diaphragm 2 in which the working gas is sealed is set to be higher than an atmospheric pressure by the working gas. Therefore, the diaphragm 2 deforms so as to protrude to the receiving member 3 side as shown in FIG. 3B. Further, the diaphragm 2 may protrude out of an opening portion of the receiving member 3 in some internal pressure so as to be exposed.

In the case mentioned above, there has been the danger that an inner wall of a storage box for carrying or the other power element comes into contact with the diaphragm 2 when preparing and carrying only the caulking fixation type power element having the working gas sealed therein in the other step, so that the diaphragm 2 is scratched to lower its durability, or the diaphragm 2 is broken.

Accordingly, an object of the present invention is to provide a power element which can prevent a diaphragm from being broken at the handling time as well as suppressing an excessive deformation of the diaphragm, in the caulking fixation type power element caulked and fixed to the valve main body, as shown in the patent document 2 mentioned above.

Means for Solving the Problem

In order to achieve the object mentioned above, a caulking fixation type power element according to the present invention has a diaphragm, an upper lid member forming in relation to the diaphragm a pressure actuation chamber in which a working gas is sealed in, a receiving member which is provided with a through hole in its center portion and is arranged in an opposite side to the upper lid member in relation to the diaphragm, and a stopper member arranged in a lower space which is formed between the diaphragm and the receiving member, and is integrated according to a circumferential welding by lapping the upper lid member, the diaphragm and the receiving member, the stopper member has a main body portion which is inserted to the through hole of the receiving member, and a flange portion which has a larger diameter than the through hole and is formed in one end of the main body portion, and the flange portion is arranged so as to come into contact with the receiving member from the lower space side.

In the caulking fixation type power element according to the present invention, the upper lid member is further provided with a sealing hole for sealing the working gas, and a sealing plug for sealing the sealing hole.

The caulking fixation type power element according to the present invention can be applied to an expansion valve provided with a valve main body having an inlet portion to which a high-pressure refrigerant is introduced, a valve chamber which is communicated with the inlet port, a valve hole which is open to the valve chamber, a valve seat which is formed in an inlet of the valve hole, and an outlet port to which refrigerant passing through the valve hole is fed, and a valve member which is arranged so as to face to the valve seat, by being attached to an upper end of the valve main body via a caulking portion.

Effect of the Invention

Since the caulking fixation type power element according to the present invention is provided with the above means, it is possible to prevent the diaphragm from being broken at the carrying time or the storing time, as well as it is possible to suppress an excessive deformation of the diaphragm after the working gas is sealed therein.

Further, since it is possible to position by an operation of attaching the valve rod to the receiving portion of the stopper member as well as it is possible to prevent the diaphragm from being broken at the caulking and fixing time to the valve main body, it is possible to simplify a positioning operation in an assembling step.

BRIEF EXPLANATION OF THE DRAWINGS

FIGS. 1A and 1B are vertical cross sectional views showing a structure of an embodiment of a caulking fixation type power element according to the present invention, in which FIG. 1A shows a state before working gas is sealed therein, and FIG. 1B shows a state after the working gas is sealed therein;

FIGS. 3A and 3B are vertical cross sectional views showing a structure of a conventional caulking fixation type power element, in which FIG. 3A shows a state before the working gas is sealed therein, and FIG. 3B shows a state after the working gas is sealed.

DETAILED DESCRIPTION OF PREFERRED EMBODIMENT

Figure 1A:
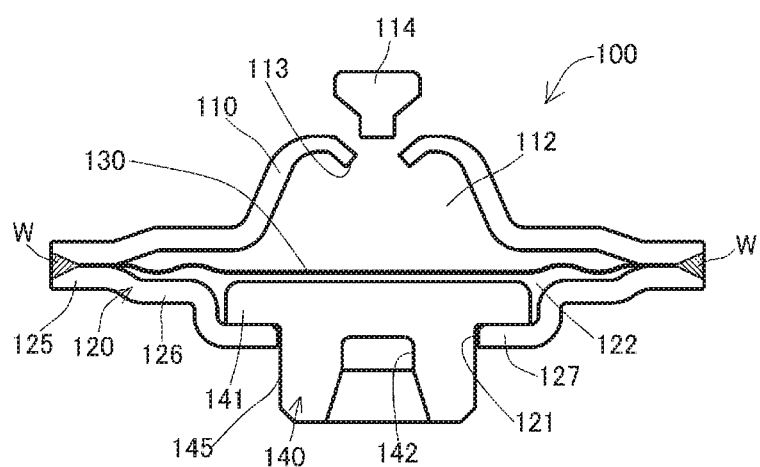
Figure 1B:
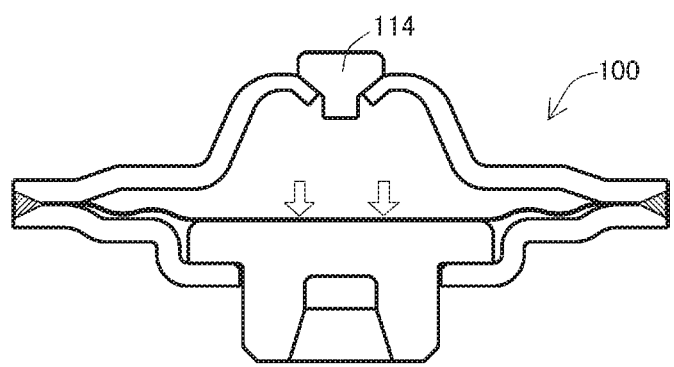

FIGS. 1A and 1B are vertical cross sectional views showing a structure of an embodiment of a caulking fixation type power element according to the present invention, in which FIG. 1A shows a state before working gas is sealed therein, and FIG. 1B shows a state after the working gas is sealed therein.

As shown in FIG. 1A, a caulking fixation type power element 100 is constructed by an upper lid member 110, a receiving member 120 which is provided in its center portion with a through hole 121, a diaphragm 130 which is sandwiched between the upper lid member 110 and the receiving member 120, and a stopper member 140 which is inserted from the through hole 121 of the receiving member 120.

A pressure actuation chamber 112 is formed in an inner portion between the upper lid member 110 and the diaphragm 130. Further, working gas, for example, such as inert gas is sealed in the pressure actuation chamber 112.

Here, a sealing hole 113 for sealing the working gas is formed in a center portion of the upper lid member 110, and the sealing hole 113 is sealed by a sealing plug 114 after the working gas is sealed in, as shown in FIG. 1B.

In the caulking fixation type power element 100 according to an embodiment of the present invention, the receiving member 120 is provided with a bottom surface portion having two stages of steps, and has a through hole 121 in its center portion. In other words, the receiving member 120 is provided with an annular outer peripheral portion 125, a first bottom surface portion 126 which is provided in an inner side thereof so as to be one stage down from the outer peripheral portion 125, and a second bottom surface portion (a flange receiving surface) 127 which is provided further in an inner side of the first bottom surface portion 126 so as to be one stage down from the first bottom surface portion 126, and the through hole 121 is formed in a center portion of the second bottom surface portion 127. Further, a lower space 122 is formed between the receiving member 120 and the diaphragm 130.

Further, a stopper member 140 is inserted to the through hole 121 of the receiving member 120.

The stopper member 140 has a main body portion 145 having a diameter which is approximately equal to or smaller than the diameter of the through hole 121 of the receiving member 120, a collar-like flange portion 141 which is formed in an upper surface side of the main body portion 145 so as to be larger in diameter than the through hole 121, and a receiving portion 142 which is formed into a hole shape from a lower surface of the main body portion 145 toward an upper side of an inner portion thereof. Further, a valve rod mentioned later is inserted to the receiving portion 142.

The stopper member 140 receives the diaphragm 130 by an upper surface including the flange portion 141, and is arranged so that the main body portion 145 is inserted to the through hole 121 of the receiving member 120 and a lower surface of the flange portion 141 comes into contact with the second bottom surface member 127 of the receiving member 120 from the lower space 122 side.

Next, a description will be given of a procedure of assembling the caulking fixation type power element 100 according to the embodiment of the present invention.

First of all, the upper lid member 110, the diaphragm 130, the stopper member 140 and the receiving member 120 are arranged so as to establish a positional relationship as shown in FIG. 1A.

Next, in a state in which outer peripheral portions of the upper lid member 110, the diaphragm 130 and the receiving member 120 are lapped, the outer peripheral portions are circumferentially welded, for example, by a TIG welding, a laser welding or a plasma welding and are integrated by forming a weld portion W.

Subsequently, as shown in FIG. 1B, the working gas is sealed in the pressure actuation chamber 112 from the sealing hole 113 formed in the upper lid member 110, and is thereafter sealed by using the sealing plug 114 in relation to the sealing hole 113, for example, by means of the projection welding.

At this time, since the diaphragm 130 is exposed to the pressure in such a manner as to protrude to the receiving member 120 side by the working gas which is sealed in the pressure actuation chamber 112, the diaphragm 130 comes into contact with an upper surface of the stopper member 140 which is arranged in the lower space 122 and is supported by the second bottom surface portion 127 of the receiving member 120, thereby being stably supported.

By employing the structure mentioned above, in the caulking fixation type power element 100 according to the present invention, the diaphragm 130 is inhibited from being excessively deformed by coming into contact with the upper surface of the stopper member 140 after the working gas is sealed in the pressure actuation chamber 112. Therefore, even if the internal pressure of the working gas is enlarged, it is possible to inhibit the diaphragm 130 from being deformed beyond an allowable stress for an elastic deformation.

Further, even if a plurality of caulking fixation type power elements 100 are thrown in a bag or a box for carrying in an offhand manner without arraying, the diaphragm 130 is protected by the receiving member 120. Therefore, it is possible to prevent the diaphragm 130 from being scratched or broken.

Figure 2:
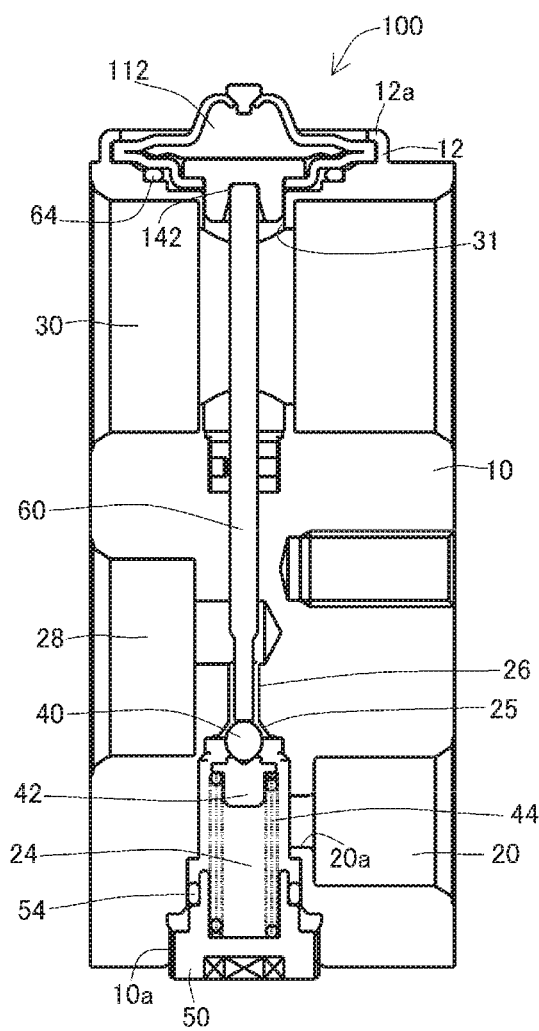
FIG. 2 is a vertical cross sectional view of an example of an expansion valve in the case that an embodiment of a caulking fixation type power element according to the present invention is applied.
Figure 3A:
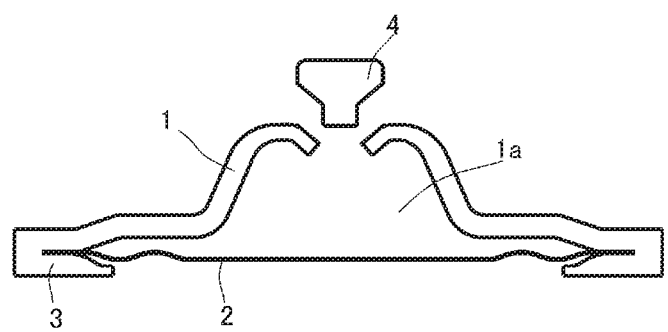
Figure 3B:
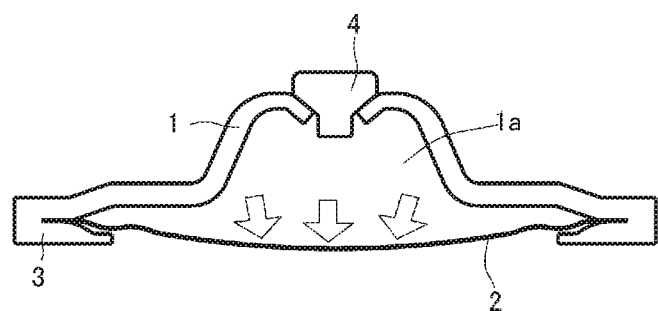

FIG. 2 is a vertical cross sectional view of an expansion valve in the case that the caulking fixation type power element according to an embodiment of the present invention is applied.

As shown in FIG. 2, a valve main body 10 of an expansion valve to which the caulking fixation type power element according to the present invention is applied is produced, for example, by applying a machine work to a member made of an aluminum alloy, and has an inlet port 20 to which a high-pressure refrigerant is introduced.

The inlet port 20 is communicated with a valve chamber 24 via a small-diameter hole 20a. Further, the valve chamber 24 is communicated with an outlet port 28 for the refrigerant via a valve hole 26 which is formed coaxially with a valve rod 60.

A valve seat 25 is formed between the valve chamber 24 and the valve hole 26, and a spherical valve member 40 arranged within the valve chamber 24 faces to the valve seat 25. Further, the valve member 40 is supported by a support member 42, and the support member 42 is supported by a plug 50 which blocks an opening portion of the valve chamber 24 via a coil spring 44.

The plug 50 is threadably engaged with an opening portion 10a of the valve chamber 24 in the valve main body 10, and a spring force of the coil spring 44 supporting the valve member 40 can be regulated by regulating a screwing amount of the plug 50.

Further, a seal member 54 is provided in an outer peripheral portion of the plug 50. As a result, the valve chamber 24 is sealed.

The refrigerant fed out of the outlet port 28 is fed to the evaporator, and the refrigerant turning back to the compressor side from the evaporator enters into a return passage 30 provided in the valve main body 10 from a left side in the drawing, and passes through the return passage 30.

In a top portion of the valve main body 10, the caulking fixation type power element 100 according to the embodiment of the present invention is attached to a cylinder portion 12 which is formed in the top portion of the valve main body 10 via a caulking portion 12a.

Further, a seal member 64 such as an O-ring is arranged between the caulking fixation type power element 100 and the valve main body 10.

At this time, an inner diameter of a communication passage 31 with the return passage 30, being formed in the top portion of the valve main body 10 is set to be greater than an outer diameter of the stopper member 140 of the caulking fixation type power element 100.

As mentioned above, the upper surface of the stopper member 140 of the caulking fixation type power element 100 according to the present invention is arranged so as to support the diaphragm 130 in a contact manner, and an upper end portion of the valve rod 60 is inserted to the receiving portion 142 of the stopper member 140 so as to be in contact and is connected.

According to the arrangement mentioned above, the stopper member 140 moves up and down on the basis of the deformation of the diaphragm 130 in response to the fluctuation of the internal pressure of the pressure actuation chamber 112 of the caulking fixation type power element 100, and the movement of the stopper member 140 is transmitted to the valve member 40 via the valve rod 60.

When the expansion valve having the structure shown in FIG. 2 is assembled, the receiving member 120 of the caulking fixation type power element 100 is seated on the top portion of the valve main body 10 in such a manner that the stopper member 140 goes into the communication passage 31 with the return passage 30 formed in the top portion of the valve main body 10, in a state in which the valve rod 60 is inserted into the receiving portion 142 of the stopper member 140 in the caulking fixation type power element 100.

Further, the caulking fixation type power element 100 is caulked and fixed to the valve main body 10 by deforming a leading end of the cylinder portion 12 of the valve main body 10 so as to come into contact with the upper lid member 110 of the caulking fixation type power element 100.

By executing the attaching procedure mentioned above, the diaphragm be neither exposed to the external portion, and nor exposed to the pressure from the stopper member when being attached to the valve main body, in the caulking fixation type power element according to the present invention, in comparison with the case that the conventional caulking fixation type power element is employed.

Therefore, according to the caulking fixation type power element of the present invention, it is possible to prevent the diaphragm from being broken when the power element is carried, or when the power element is attached to the expansion valve.

Further, since the caulking fixation type power element can be positioned by a motion of attaching the valve rod to the receiving portion of the stopper member at the attaching time, it is possible to simplify a positioning motion in an assembling step.

DESCRIPTION OF REFERENCE NUMERALS 10 valve main body
12 cylinder portion
12a caulking portion
20 inlet port
24 valve chamber
25 valve seat
26 valve hole
28 outlet port
30 return passage
40 valve member
42 support member
44 coil spring
50 plug
54 seal member
60 valve rod
64 seal member
100 caulking fixation type power element
110 upper lid member
112 pressure actuation chamber
113 sealing hole
114 sealing plug
120 receiving member
121 through hole
125 (annular) outer peripheral portion
126 first bottom surface portion
127 second bottom surface portion
130 diaphragm
140 stopper member
141 flange portion
142 receiving portion
145 main body portion

What is claimed is:

1. An expansion valve comprising:
a valve main body comprising an inlet port for receiving a high-pressure refrigerant,
a valve chamber which is communicated with said inlet port, a valve hole, which is open to said valve chamber, a valve seat, which is formed in an inlet of said valve hole, and an outlet port for receiving the refrigerant that passes through said valve hole;
a valve member arranged so as to face said valve seat;
a caulking fixation type power element attached to an upper end of said valve main body; and
a sealing member arranged between said power element and said valve main body, wherein said power element comprises:
a diaphragm;
an upper lid member, said upper lid member and said diaphragm forming a pressure actuation chamber for sealing a working gas therein;
a receiving member for receiving the pressure actuation chamber, said receiving member comprising an annular outer peripheral portion, a first bottom surface portion provided in an inner side of the outer peripheral portion such that the first bottom surface portion is parallel to and at a lower elevation than the outer peripheral portion, and a second bottom surface portion provided further in an inner side of the first bottom surface portion such that the second bottom surface portion is parallel to and at a lower elevation than the first bottom surface portion, and
a center portion with a through hole in the bottom surface, said receiving member being arranged such that said diaphragm is sandwiched between said upper lid member and said annular outer peripheral portion of said receiving member and such that a lower space is formed between said diaphragm and said receiving member; and
a stopper member arranged in said lower space, wherein outer peripheral portions of said upper lid member, said diaphragm and said receiving member are integrated by a circumferential welding, wherein said stopper member comprises a main body portion and a flange portion, said flange portion being formed on an upper side of said main body portion with a diameter larger than said through hole of said receiving member, and wherein said stopper member is arranged such that said main body portion is inserted into said through hole and such that said flange portion is arranged in said lower space for contacting with the second bottom surface portion of said receiving member,
wherein the valve main body further comprises a caulking portion configured to fixedly attach the outer peripheral portion of the caulking fixation type power element to the upper end of said valve main body in a state that a lower surface of the annular outer peripheral portion of the receiving member is directly in contact with the valve main body and an upper surface of the outer peripheral portion of the upper lid member is directly in contact with the caulking portion,
wherein the sealing member is arranged between and in contact with the first bottom surface portion of the receiving member of the power element and the valve main body in a way such that the first bottom surface portion does not contact the valve main body, and wherein a diameter of the flange portion of the stopper member is smaller than a maximum diameter of the second bottom surface portion and the flange portion of the stopper member is arranged in a space portion of the lower space that is located above the second bottom surface portion.

2. The expansion valve according to claim 1, wherein said upper lid member further comprises a sealing hole for filling said working gas in the pressure actuating chamber, and a sealing plug for sealing said sealing hole.

3. A caulking fixation type power element for attaching to an upper end of a valve main body of an expansion valve via a caulking portion, comprising:
a diaphragm;
an upper lid member, said upper lid member and said diaphragm forming a pressure actuation chamber for sealing a working gas therein;
a receiving member for receiving the pressure actuation chamber, said receiving member comprising an annular outer peripheral portion, a first bottom surface portion provided in an inner side of the outer peripheral portion such that the first bottom surface portion is parallel to and at a lower elevation than the outer peripheral portion, and a second bottom surface portion provided further in an inner side of the first bottom surface portion such that the second bottom surface portion is parallel to and at a lower elevation than the first bottom surface portion, said receiving member having a through hole in a center portion thereof and is arranged such that said receiving member and said upper lid member sandwiches said diaphragm therebetween and such that a lower space is formed between said diaphragm and said receiving member; and a stopper member arranged in said lower space, wherein outer peripheral portions of said diaphragm, said upper lid member and said receiving member are integrated according to a circumferential yielding, wherein said stopper member comprises a main body portion and a flange portion, said flange portion being formed on an upper side of said main body portion with a diameter larger than said through hole of said receiving member, wherein said stopper member is arranged such that said main body portion is inserted into said through hole and such that said flange portion is arranged in said lower space, wherein said diaphragm is deformed to expand the pressure actuation chamber in a state where said caulking fixation type power element has not yet installed to the expansion valve and thereby is in contact with said flange portion of said stopper member, wherein outer peripheral portions of the caulking fixation type power element are configured to be fixedly attached to an upper end of the valve main body by a caulking portion of the valve main body in a state that a lower surface of the annular outer peripheral portion of the receiving member is directly in contact with the valve main body and an upper surface of an outer peripheral portion of the upper lid member is directly in contact with the caulking portion, wherein the first bottom surface portion of the receiving member is configured in a way such that a sealing member is arranged between and in contact with the first bottom surface portion and the valve main body in a way such that the first bottom surface portion does not contact the valve main body, and wherein a diameter of the flange portion of the stopper member is smaller than a maximum diameter of the second bottom surface portion and the flange portion of the stopper member is arranged in a space portion of the lower space that is located above the second bottom surface portion.

4. The expansion valve according to claim 1, wherein said valve main body further comprises: a first surface facing to the second bottom surface portion; and a second surface substantially parallel to and at a higher elevation than the first surface, and wherein the sealing member is arranged between and in contact with the first bottom surface portion of the receiving member of the power element and the second surface of the valve main body.

5. The caulking fixation type power element according to claim 3, wherein said upper lid member further comprises a sealing hole for filling said working gas in the pressure actuation chamber, and a sealing plug for sealing said sealing hole.

\* \* \* \* \*